United States Patent [19]

Disteldorf et al.

[11] Patent Number: 4,500,698
[45] Date of Patent: Feb. 19, 1985

[54] ONE-COMPONENT BAKING ENAMELS

[75] Inventors: Josef Disteldorf, Herne; Rainer Gras, Bochum, both of Fed. Rep. of Germany

[73] Assignee: Chemische Werke Huls Aktiengesellschaft, Marl, Fed. Rep. of Germany

[21] Appl. No.: 622,196

[22] Filed: Jun. 19, 1984

[30] Foreign Application Priority Data

Jun. 24, 1983 [DE] Fed. Rep. of Germany ....... 3322721

[51] Int. Cl.³ .............................................. C08G 18/80
[52] U.S. Cl. ..................................................... 528/45
[58] Field of Search ........................................... 528/45

[56] References Cited
U.S. PATENT DOCUMENTS 4,354,014 10/1982 Wolf et al. ............................... 528/45
4,383,076 5/1983 Wolf et al. ............................... 528/45

Primary Examiner—Maurice J. Welsh
Attorney, Agent, or Firm—Oblon, Fisher, Spivak, McClelland & Maier

[57] ABSTRACT

One-component baking enamels of polyesters, which contain hydroxyl groups, and a polyisocyanate component, wherein the polyisocyanate component is a totally or partially blocked adduct or adducts of a mixture of 2-methyl-1,5-diisocyanatopentane (I) and 2-ethyl-1,5-diisocyanatobutane (II) according to the formulas (I) and (II):

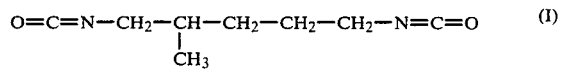

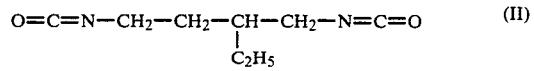

wherein the mixture of diisocyanates contains 88 to 99% by weight of totally or partially blocked (I) and about 12 to 1% by weight of totally or partially blocked (II).

The enamel films exhibit excellent flexibility and weather resistance and can be coated on metal, glass and plastic.

11 Claims, No Drawings

ONE-COMPONENT BAKING ENAMELS

BACKGROUND OF THE INVENTION

1. Field of the Invention

This invention relates to polyurethane one-component baking enamels containing solvents, consisting of polyisocyanates exhibiting isocyanurate or urethane groups totally or partially blocked with blocking agents known in the art and having a base of 2-methyl-1,5-diisocyanatopentane (MPDI) or a mixture of MPDI and 2-ethyl-1,4-diisocyanatobutane (EBDI) and polyesters containing hydroxyl with a base of mainly aromatic dicarboxylic acids, diols and triols.

2. Description of the Prior Art

For the production of mixtures of polyisocyanates and polyoxy compounds that are stable at the usual temperatures, as is known, polyisocyanates are used whose reactive groups are closed by reaction with monofunctional compounds and generally are designated as masked or blocked polyisocyanates. Products of this type are described, for example, in Annalen, Volume 562 (1949) pp. 205-229.

At higher temperatures, the blocked polyisocyanates break down into their initial components, whereby the isocyanate groups, which are released, in turn can react with the polyoxy compounds that are present in the reaction mixture.

If these mixtures of blocked polyisocyanates and polyoxy compounds are to be applied for coating objects by the spraying or curtain coating process and for coating of sheet metal by roll coating, especially by the coil coating process, both the cross-linking agent and the resin must be soluble in conventional varnish solvents and be stable in storage.

With only few exceptions, aliphatic polyisocyanates blocked with ε-caprolactam or acetoxime, are incompatible with conventional varnish solvents. They are, therefore, eliminated as initial components for production of PUR one-component baking enamels preferably for coating metal objects with highly deformable coatings.

Production of hexamethylenediisocyanate (HDI) blocked with ε-caprolactam or acetoxime in the usual varnish solvents is thwarted by incompatibility. These products precipitate during or shortly after the reaction. Even partial blocking of HDI and subsequent reaction with the polyoxy compounds was able to give the varnish solution only a short-lived stability in storage. An improvement, of course not yet satisfactory for practice, can be achieved by use of blocked HDI isocyanurate. The compatibility with polyhydroxy compounds generally used in PUR varnishes is only partial and solubility is limited especially in nonpolar solvents such as mineral spirits. A further drawback of those HDI isocyanurates is their limited thermal and oxidation stability, which is seen in practice in overbaking, e.g., caused when the conveyor is stopped during the hardening process. The results are quality losses such as, for example, discoloration of the enamel films.

Therefore, a need clearly continues to exist for polyisocyanates which, although totally or partially blocked, are compatible with conventional varnish solvents and which have excellent storage stability in such varnish solvents.

SUMMARY OF THE INVENTION

Accordingly, it is an object of the present invention to provide polyisocyanates which, although totally or partially blocked, are compatible with conventional varnish solvents and which have excellent storage stability.

It is also an object of this invention to provide, in particular, polyisocyanates which, although totally or partially blocked, are compatible with polyhydroxy compounds which are used in PUR varnishes.

Moreover, it is an object of the present invention to provide, in particular, polyisocyanates which, although totally or partially blocked, have excellent thermal and oxidative stability.

In particular, it is an object of this invention to provide polyurethane one-component baking enamels containing polyisocyanates which, although totally or partially blocked, exhibit excellent compatibility with varnish solvents and excellent storage stability in the same.

According to the present invention, the foregoing and other objects are attained by providing one-component baking enamel of polyesters, which contain hydroxyl groups, and a polyisocyanate component, wherein the polyisocyanate component is a totally or partially blocked adduct or adducts of a mixture of 2-methyl-1,5-diisocyanatopentane (I) and 2-ethyl-1,4-diisocyanatobutane (II) according to formulas (I) and (II):

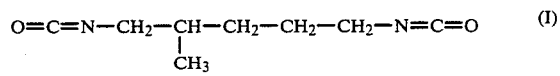

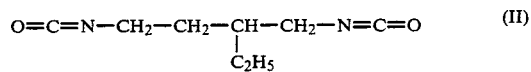

wherein the diisocyanate mixture comprises about 88 to 99% by weight of 2-methyl-1,5-diisocyanatopentane and about 12 to 1% by weight of 2-ethyl-1,4-diisocyanatobutane.

DETAILED DESCRIPTION OF THE PREFERRED EMBODIMENTS

Surprisingly, it has been found that aforementioned drawbacks of the conventional PUR varnishes are eliminated by use of polyisocyanates exhibiting isocyanurate or urethane groups totally or partially blocked with blocking agents known in the art and having a base of 2-methyl-1,5-diisocyanatopentane (MPDI) or a mixture of it and 2-ethyl-1,4-diisocyanatobutane (EBDI) in which the diisocyanate mixture exhibits the following composition:

88 to 99% by weight of 2-methyl-1,5-diisocyanatopentane (MPDI), 12 to 1% by weight of 2-ethyl-1,4-diisocyanatobutane (EBDI), with (MPDI) or (MPDI/EBDI) mixtures which are free of adducts optionally added.

The adducts according to the invention exhibit an NCO content of 10 to 45% by weight, which is reduced to $\leqq 8$, preferably $\leqq 6\%$ by weight by total or partial blocking with blocking agents known in the art. The hardening agents according to the invention are reacted in combination with polyesters containing hydroxyl groups and having a base mainly of aromatic dicarboxylic acids, diols and triols. Mixtures of this type are applied in the usual varnish solvents, optionally with admixture of the materials customary in PUR chemistry and hardened by heat treatment between about 120° to 350° C., preferably between about 140° and 300° C. The mixture ratio of the binder components can vary broadly. The best varnish technical characteristics are achieved if the binder mixture consists of about 50 to 90% by weight of polyester and about 50 to 10% by weight of cross-linking agent, whereby the OH/NCO ratio can vary from about 1:0.8 to 1:1.2, preferably about 1:0.95 to 1:1.1. It is particularly recommended that an equivalent of NCO of the cross-linking agent be used per OH equivalent of the polyhydroxy compound.

The adduct can consist of MPDI or a mixture of MPDI and EBDI and/or trimerized MPDI or trimerized MPDI/EBDI mixture and optionally higher oligomers and have an average NCO content of about 10 to 45% by weight, preferably about 20 to 40% by weight, which is reduced to ≦8% by weight, preferably ≦6% by weight of NCO, by blocking with blocking agents known in the art. Trimerization can be performed in a known way, e.g., according to the data in GB PS No. 1 391 066, DE-OS No. 23 25 826, DE-OS No. 26 44 684 or DE-OS No. 29 16 201.

The trimerization can be performed in substance or in organic solvents. The catalytic reaction should be stopped as soon as the NCO content of the mixture indicates that 10 to 50% of the NCO groups have reacted. The unreacted diisocyanate or diisocyanate mixture is then separated with the catalyst.

The resulting isocyanurate of the MPDI or MPDI/EBDI mixture can optionally be adjusted by admixture of monomer MPDI or MPDI/EBDI mixture of isophoronediisocyanate to the desired NCO content and can then be blocked.

Trimerization can also be performed in situ, thus also partially, to the desired NCO content.

The adducts can also consist of MPDI containing urethane groups of MPDI/EBDI mixture, which have an average NCO content of about 10 to 40% by weight, which is reduced to ≦8% by weight, preferably to ≦6% by weight of NCO by blocking with blocking agents known in the art.

Lower molecular diols or polyols such as, for example, ethylene glycol, 1,4-butylene glycol, hexamethylene glycol, neopentyl glycol, hydroxypivalic acid neopentyl glycol ester, 1,4-dihydroxymethylcyclohexane, 2,4,4-(2,2,4)-trimethylhexanediol, diethylene and triethylene glycol, diethanolmethylamine, triethanolamine, trimethylolpropane, trimethylolethane, and pentaerythritol serve to form urethane groups in the adduct. The reactants in this case are preferably used in such weight ratios that they amount to 2 NCO groups of MPDI or MPDI/EBDI mixture per OH group of the polyol.

The properties of the products of the process can easily be varied in all adducts by the proportion of pure MPDI or MPDI/EBDI mixture. By raising the content of the MPDI or MPDI/EBDI mixture, the viscosity can be reduced, the NCO content and flexibility increased.

The isocyanate component is introduced and the blocking agent added to perform the blocking reaction. The reduction can be performed in substance at about 80° to 120° C. or also in the presence of suitable inert solvents. For the isocyanate polyaddition reactions the catalysts customary in PUR chemistry can be added in an amount of about 0.001 to 1% by weight, relative to the compounds with hydrogen atoms that are reactive toward isocyanates.

Suitable blocking agents are, for example, phenols such as phenol, the isomer cresols, oximes such as acetoxime, methyl ethyl ketoxime, cyclohexanoxime, alcohols such as methyl alcohol, ethyl alcohol, isopropyl alcohol, tert-butyl alcohol or cyclohexanol, ethyl malonate, ethyl acetoacetate, various isomer triazoles, 6-methyl-2-piperidone and lactams, such as ε-valerolactam, especially ε-caprolactam.

For blocking in solvents, only those that do not react with the polyisocyanates are suitable, for example, ketones such as acetone, methyl ethyl ketone, methyl isobutyl ketone, cyclopentanone and cyclohexanone or aromatic hydrocarbons such as benzene, toluene, xylene, chlorobenzene, nitrotoluene, cyclic ethers such as tetrahydrofuran and dioxane or esters such as n-butyl acetate, n-hexyl acetate, ethyl glycol acetate and aliphatic chlorinated hydrocarbons such as chloroform, carbon tetrachloride, and aprotic solvents such as dimethylformamide or dimethyl sulfoxide.

The products of the process according to the invention, when used as hardening agents for one-component baking enamels are combined with the usual resins for polyurethane-base baking enamels containing solvents, i.e., preferably combined with resins containing hydroxyl groups.

Suitable resins containing hydroxyl groups are those that have a low second order transition temperature of <20° to >−25° C. are compatible in the usual varnish solvents, whose hydroxyl numbers are between about 30 and 300 mg KOH/g, preferably between about 70 and 150 mg KOH/g, whose acid number is <2 mg KOH/g and whose average molecular weight is between about 400 and 10,000, preferably between about 1,000 and 5,000.

Essential ingredients of these polyesters are:

1. Cyclic polycarboxylic acids and their esters and anhydrides, e.g., phthalic, isophthalic, terephthalic acid, benzenetricarboxylic acids, trimellitic acid anhydride, diethyl terephthalate and their hydrogenation products.

2. Diols, e.g., ethylene glycol, 1,2-propylene glycol, 1,2- or 1,3- or 1,4-butylene glycol, 3-methyl-1,5-pentanediol, hexamethylene glycol, cyclohexanediol, 4,4'-dihydroxy-2,2-dicyclohexylpropane, 1,4-dihydroxymethylcyclohexane, diethylene glycol, triethylene glycol, neopentyl glycol, hydroxypivalic acid neopentyl glycol ester, 2,2,4-(2,4,4)-trimethylhexanediol.

3. Polyols such as glycerin, hexanetriol, pentaerythritol, trimethylolpropane (TMP), trimethyolethane.

The polyesters can proportionately also contain monofunctional carboxylic acids, e.g., benzoic acid and acyclic polycarboxylic acids, such as adipic acid, 2,2,4-(2,4,4)-trimethyladipic acid, sebacic and dodecanedicarboxylic acid.

The polyesters are produced, in a way known in the art, by esterification or transesterification, optionally in the presence of the usual catalysts.

Suitable solvents for the one-component baking enamels according to the invention are those whose lower boiling point is around 100° C. The upper limit of the boiling point of the solvent depends on the particular baking conditions. If the baking is performed at higher temperatures, the boiling points of the solvents used must also be at higher temperatures. The solvents already described, e.g., Solvesso ®150 or 200 (mixture of aromatic hydrocarbons of the Esso Co.) are suitable, among others. All solvents can be used as mixtures.

The concentration of the mixture of resin and cross-linking agent in the solvents mentioned above is between about 30 and 90% by weight, preferably between about 40 and 80% by weight.

The polyurethane one-component baking enamels according to the invention are produced by mixing with the polyester component when totally blocked cross-linking agents are used, while when partially blocked cross-linking agents are used, the NCO are reacted in a prereaction with the OH groups, optionally in the presence of the catalysts that are customary in PUR chemistry. The homogenization and optionally the reaction occur between 20° and 100° C. in suitable mixing units. Then the usual additives, such as pigments, fillers, leveling agents, gloss improvers, defoaming agents, wetting agents and stabilizing agents can be added to the varnish solution. These additives are abraded in stirred sand or ball mills.

The one-component baking enamels are suitable for application especially to metal surfaces but also to objects made of other materials, such as glass or plastic. The enamels according to the invention have application especially in coil coating for one and two weather-resistant coats.

Hardening of the enamels according to the invention occurs, depending on the specific application, in a temperature range of about 120° to 350° C., preferably between about 140° and 300° C. in a period of about 30 minutes to 30 seconds. The enamel films exhibit outstanding enamel technical properties, especially great flexibility and weather resistance.

The present invention will be further illustrated by certain examples and references which are provided for purposes of illustration only and are not intended to limit the present invention.

EXPERIMENTAL PART

A. Production of totally or partially blocked polyisocyanates

EXAMPLE 1

1,000 parts by weight of MPDI and 0.1 part by weight of catalyst (triethylenediamine/propylene oxide 1:1) were mixed with vigorous stirring at 80° C. A heat tonality occurred immediately, whereby the temperature of the reaction mixture rose to about 91° C. The reaction mixture was heated for another 20 minutes at this temperature. During this period, the NCO content dropped to 38.2% by weight. The reaction mixture was distilled at 160° C./0.1 torr in a thin-layer evaporator to remove the unreacted MPDI. The reaction product (residue of the thin-layer evaporation) had an NCO content of 20.2% by weight and a monomer content of <0.6% by weight. The viscosity was 10,900 mPa.s at 25° C.

(1a) 63.45 parts by weight of ε-caprolactam were added to 116.55 parts by weight of MPDI-isocyanurate in 120 parts by weight of solvent at 80° C. by portions so that the reaction temperature did not exceed 120° C. After addition of the ε-caprolactam was completed, heating was continued for 2 more hours.
  NCO content (latent)—7.84% by weight
  NCO content (free)—<0.2% by weight
  The efflux time in a DIN-4 flow cup at 20° C. of the 60% solution was:

| (a) n-butyl acetate (BA)/xylene | 1:3 | 55 sec |
| (b) EGA/xylene | 1:2 | 71 sec |
| (c) EGA/Solvesso ® 150 | 1:2 | 134 sec |

(1b) Operation as in example (1a) but with 126 parts by weight of MPDI-isocyanurate and 54 parts by weight of ε-caprolactam
  NCO content (latent)—8.5% by weight
  NCO content (free)—1.7% by weight
  Efflux time in a DIN-4 flow cup at 20° C. in the 60% solution was:

| (a) EGA/xylene | 1:2 | 49 sec |
| (b) EGA/Solvesso ® | 1:2 | 125 sec |

Xylene can also be used as technical grade. Solvesso ® 150 is an aromatic hydrocarbon mixture (98%) with a boiling range of 177° to 206° C. and has a dew point of at least 66° C. Supplier: ESSO.

(1c) 39 parts by weight of acetoxime were added to 111 parts by weight of MPDI-isocyanurate in 100 parts by weight of solvent mixture at 80° C. in portions and with vigorous stirring so that the temperature of the reaction mixture did not exceed 100° C. When addition of the acetoxime was completed, the reaction mixture was heated for 2 hours longer at 100° C.
  NCO content (latent)—8.96% by weight
  NCO content (free)—<0.1% by weight
  The efflux time in a DIN-4 flow cup at 20° C. of the 60% solution was:

| (a) BA/xylene | 1:3 | 127 sec |
| (b) EGA/xylene | 1:2 | 148 sec |
| (c) EGA/Solvesso ® 150 | 1:2 | 279 sec |

(1d) Operation as in example (1c) but with 116.8 parts by weight of MPDI-isocyanurate and 33.2 parts by weight of acetoxime.
  NCO content (latent)—9.43% by weight
  NCO content (free)—1.8% by weight
  The efflux time in a DIN-4 flow cup at 20° C. of the 60% solution was:

| (a) BA/xylene | 1:3 | 64 sec |
| (b) EGA/xylene | 1:2 | 87 sec |

EXAMPLE 2

Analogously to the process described in example A.1, 500 parts by weight of MPDI/EBDI mixture (94:6) were trimerized. The isocyanatoisocyanurate isolated after thin-layer distillation had an NCO content of 19.97% by weight and a monomer content of <0.7% by weight. The viscosity was 10,500 mPa.s at 25° C.

(2a) to (d)

The blocking reaction was performed as described in examples (A.1a) and (A.1c). Concentration of the cross-linking agent solutions was 60% by weight.

| Example | O.Z. 3900 | | | |
|---|---|---|---|---|
| | A2a | A2b | A2c | A2d |
| Pt by wt acc. to A.2 | 390.1 | 421.6 | 445.2 | 468.5 |
| Pt by wt caprolactam | 209.9 | 178.4 | — | — |
| Pt by wt acetoxime | — | — | 154.8 | 131.5 |

-continued

| Example | O.Z. 3900 | | | |
|---|---|---|---|---|
| | A2a | A2b | A2c | A2d |
| NCO content (latent) % by wt | 7.8 | 8.4 | 8.9 | 9.36 |
| NCO content (free) % by wt | <0.1 | 1.78 | <0.1 | 1.82 |
| Efflux time in DIN-4 flow cup at 20° C. | | | | |
| BA/xylene 1:3 sec | 60 | — | 134 | 75 |
| EGA/xylene 1:2 sec | 78 | 53 | 159 | 103 |
| EGA/Solvesso ® 150 1:2 sec | 145 | 129 | 285 | — |

EXAMPLE 3

Analogously to the process described in example A.1, 500 parts by weight of MPDI/EBDI mixture were partially trimerized to an NCO content of 32% by weight. Evacuation was performed for a half hour at 260 Pa to deactivate the catalyst. After cooling, the reaction mixture had an NCO content of 28% by weight. The viscosity was 550 mPa.s at 25° C.

(3a) to (d)

The blocking reaction was performed as described in examples (A.1a) and (A.1c). The concentration of the cross-linking agent solutions was 60% by weight.

| Example | O.Z. 3900 | | | |
|---|---|---|---|---|
| | A3a | A3b | A3c | A3d |
| Pt by wt acc. to A.3 | 341.9 | 369.6 | 403.4 | 424.4 |
| Pt by wt caprolactam | 258.1 | 230.4 | — | — |
| Pt by wt acetoxime | — | — | 196.6 | 175.6 |
| NCO content (latent) % by wt | 9.6 | 10.35 | 11.3 | 11.9 |
| NCO content (free) % by wt | <0.1 | 1.8 | <0.1 | 1.77 |
| Efflux time in DIN-4 flow cup at 20° C. | | | | |
| BA/xylene 1:3 sec | — | — | 78 | 41 |
| EGA/xylene 1:2 sec | 31 | 26 | 101 | 58 |
| EGA/Solvesso ® 150 1:2 sec | 101 | 84 | — | — |

EXAMPLE 4

Analogously to the process described in example A.1, 500 parts by weight of MPDI/EBDI mixture were partially trimerized to an NCO content of 39.3% by weight. Evacuation was performed for a half hour at 260 Pa to deactivate the catalyst. After cooling, the reaction mixture had an NCO content of 35% by weight. The viscosity was 37 mPa.s at 25° C.

(4a) to (d)

The blocking reaction was performed as described in examples (A.1a) to (A.1c). The concentration of the cross-linking agent solution was 60% by weight.

| Example | O.Z. 3900 | | | |
|---|---|---|---|---|
| | A4a | A4b | A4c | A4d |
| Pt by wt acc. to A.4 | 61.76 | 66.74 | 74.58 | 78.46 |
| Pt by wt caprolactam | 58.24 | 53.26 | — | — |
| Pt by wt acetoxime | — | — | 45.42 | 42.54 |
| NCO content (latent) % by wt | 10.8 | 11.7 | 13.05 | 13.7 |
| NCO content (free) % by wt | <0.1 | 1.81 | <0.1 | 1.78 |
| Efflux time in DIN-4 flow cup at 20° C. | | | | |
| BA/xylene 1:3 sec | — | — | 32 | 21 |
| EGA/xylene 1:2 sec | 21 | 18 | 58 | 40 |
| EGA/Solvesso ® 150 1:2 sec | 62 | 46 | — | — |

EXAMPLE 5

134 parts by weight of trimethylolpropane were added in portions to 650 parts by weight of MPDI/EBDI mixture at 80° C. with vigorous stirring. After the addition, the reaction mixture was heated for another hour at 100° C. Then the unreacted diisocyanate was removed by thin-layer distillation at 160° C./0.1 torr. The reaction product (residue) had an NCO content of 17.1% by weight and a monomer content of <0.7% by weight. The viscosity was 105,000 mPa.s at 40° C.

(5a) to (d)

The blocking reaction was performed as described in examples (A.1a) and (A.1c). The concentration of the cross-linking agent solutions was 60% by weight.

| Example | | | | |
|---|---|---|---|---|
| | A5a | A5b | A5c | A5d |
| Pt by wt acc. to A.5 | 164.24 | 177.72 | 136.69 | 145.92 |
| Pt by wt caprolactam | 75.76 | 62.28 | — | — |
| Pt by wt acetoxime | — | — | 41.31 | 34.08 |
| NCO content (latent) % by wt | 7 | 7.65 | 7.9 | 8.32 |
| NCO content (free) % by wt | <0.1 | 1.8 | <0.1 | 1.76 |
| Efflux time in DIN-4 flow cup at 20° C. | | | | |
| BA/xylene 1:3 sec | — | — | not measurable | not measurable |
| EGA/xylene 1:2 sec | 211 | 200 | | |
| EGA/Solvesso ® 150 1:2 sec | 374 | 331 | — | — |

EXAMPLE 6

59.5 parts by weight of trimethylolpropane were added in portions to 290.5 parts by weight of MPDI/EBDI mixture at 80° C. with vigorous stirring. After addition of the TMP was completed, the reaction mixture was heated for another hour at 100° C. The reaction product had an NCO content of 25.4% by weight and a viscosity of 2,650 mPa.s at 25° C.

(6a) to (d)

The blocking reaction was performed as described in examples (A.1a) and (A.1c). The concentration of the cross-linking agent solution was 60% by weight.

| Example | O.Z. 3900 | | | |
|---|---|---|---|---|
| | A6a | A6b | A6c | A6d |
| Pt by wt acc. to A.6 | 71.12 | 76.92 | 83.12 | 87.44 |
| Pt by wt caprolactam | 48.88 | 43.08 | — | — |
| Pt by wt acetoxime | — | — | 36.88 | 32.56 |
| NCO content (latent) % by wt | 9.1 | 9.8 | 10.58 | 11.15 |
| NCO content (free) % by wt | <0.1 | 1.82 | <0.1 | 1.77 |
| Efflux time in DIN-4 flow cup at 20° C. | | | | |
| BA/xylene 1:3 sec | — | — | 212 | 189 |
| EGA/xylene 1:2 sec | 58 | 49 | 375 | 311 |
| EGA/Solvesso ® 150 1:2 sec | 85 | 65 | — | — |

EXAMPLE 7

43.7 parts by weight of trimethylolpropane were added in portions to 306.3 parts by weight of MPDI/EBDI mixture at 80° C. with vigorous stirring. After addition of the TMP was completed, the reaction mixture was heated for another hour at 100° C. The reaction product had an NCO content of 32% by weight and a viscosity of 158 mPa.s at 25° C.

(7a) to (d)

The blocking reaction was performed as described in examples (A.1a) and (A.1c). The concentration of the cross-linking agent solution was 60% by weight.

|  | O.Z. 3900 | | | |
|---|---|---|---|---|
| Example | A7a | A7b | A7c | A7d |
| Pt by wt acc. to A.7 | 64.42 | 69.66 | 77.08 | 81.10 |
| Pt by wt caprolactam | 55.58 | 50.34 | — | — |
| Pt by wt acetoxime | — | — | 42.92 | 38.90 |
| NCO content (latent) % by wt | 10.3 | 11.14 | 12.3 | 13 |
| NCO content (free) % by wt | <0.1 | 1.8 | <0.1 | 1.82 |
| Efflux time in DIN-4 flow cup at 20° C. | | | | |
| BA/xylene 1:3 sec | — | — | 115 | 91 |
| EGA/xylene 1:2 sec | 31 | 20 | 169 | 124 |
| EGA/Solvesso ® 150 1:2 sec | 37 | 27 | — | — |

B. Polyester 1. 7 mol (1,162 g) of isophthalic acid, 2 mol (268 g) of trimethylolpropane, 5 mol (590 g) of hexamethylene glycol and 1 mol (160 g) of 2,2,4- or 2,4,4-trimethyl hexamethylene glycol were put into a 4-liter glass flask for esterification. 0.05% by weight of di-n-butyltin oxide was used as the esterification catalyst. The first water separation occurred at about 190° C. The temperature was raised to 220° C. within 6 to 8 hours. Esterification was completed within 6 hours at 220° C. The polyester was cooled to 200° C. and substantially freed of the volatile components within 30 to 45 minutes by creation of a vacuum (15 to 30 mmHg). During the entire reaction a weak $N_2$ current was passed through the reaction mixture.

| Physical Data | |
|---|---|
| OH number | 90 to 105 mg KOH/g |
| Acid number | <2 mg KOH/g |
| Second order transition temperature (DTA) | +4 to +12° C. |

The efflux time in a DIN-4 flow cup at 20° C. of the 60% solution in

| (a) butyl acetate/xylene | 1:3 | 405 sec |
|---|---|---|
| (b) EGA/xylene | 1:2 | 573 sec |
| (c) EGA/Solvesso ® 150 | 1:2 | 1006 sec |

2. 7 mol (1,162 g) of isophthalic acid, 6 mol (708 g) of hexamethylene glycol and 2 mol (268 g) of trimethylolpropane were esterified to an acid number of <2 mg KOH/g as in Example B.1.

| Physical Data | |
|---|---|
| OH number | 100 to 105 mg KOH/g |
| Acid number | <2 mg KOH/g |
| Second order transition temperature (DTA) | +4 to +12° C. |

The efflux time in a DIN-4 flow cup at 20° C. of the 60% solution in

| (a) butyl acetate/xylene | 1:3 | 525 sec |
|---|---|---|
| (b) EGA/xylene | 1:2 | 657 sec |
| (c) EGA/Solvesso ® 150 | 1:2 | 1,133 sec |

3. 7 mol (1,162 g) of isophthalic acid, 5 mol (590 g) of hexamethylene glycol, 1 mol of 3-methyl-1,5-pentanediol and 2 mol (268 g) of trimethylolpropane were esterified to an acid number of 2 mg KOH/g as in Example B.1.

| Physical Data | |
|---|---|
| OH number | 95 to 105 mg KOH/g |
| Acid number | <2 mg KOH/g |
| Second order transition temperature (DTA) | +4 to +16° C. |

The efflux time in a DIN-4 flow cup at 20° C. of the 60% solution in

| (a) butyl acetate/xylene | 1:3 | 300 sec |
|---|---|---|
| (b) EGA/xylene | 1:2 | 470 sec |
| (c) EGA/Solvesso ® 150 | 1:2 | 751 sec |

4. 7 mol (1,162 g) of isophthalic acid, 5 mol (590 g) of hexamethylene glycol, 1 mol (104 g) of neopentyl glycol and 2 mol (268 g) of trimethylolpropane were esterified to an acid number of <2 mg KOH/g as in example B.1.

| Physical Data | |
|---|---|
| OH number | 100 to 105 mg KOH/g |
| Acid number | <2 mg KOH/g |
| Second order transition temperature (DTA) | +4 to +12° C. |

The efflux time in a DIN-4 flow cup at 20° C. of the 60% by weight solution shows:

| (a) n-butyl acetate/xylene (tech) | 1:3 | 597 sec |
|---|---|---|
| (b) EGA/xylene (tech) | 1:2 | 704 sec |
| (c) EGA/Solvesso ® 150 | 1:2 | 1025 sec |

C. Polyurethane one-component baking enamels

Both the 60% by weight isocyanate solutions and the 60% by weight polyester solutions were used for formulating the pigmented enamel systems.

EXAMPLE 1

39.66% by weight of polyester solution according to B.2 were mixed with 22.84% by weight of blocked isocyanate solution according to (A.2a) and 7% by weight of solvent and then abraded with 29.4% by weight of white pigment ($TiO_2$), 0.1% by weight of leveling agent (silicone oil of Bayer AG), 1% by weight of defoaming agent (Byk-spezial of Byk-Mallinkrodt company) in a stirred ball mill.

Application was made on 1-mm steel and aluminum sheets and hardening was performed in a recirculated air drying box. The hardening temperatures were 150° to 300° C.

The abbreviations used in the following tables are:

HK—hardness according to Koenig (in sec)—(DIN 53 157)
HB—hardness according to Buchholz—(DIN 53-153)
ET—Erichsen test (in mm)—(DIN 53 156)
CT—cross-cut test—(DIN 53 151)
GG 20° and GG 60°—measurement of gloss according to Gardner—(ASTM-D 523)
Imp. rev.—Impact reverse (in inch.lb)

| Hardening Conditions Time/Temp. min./°C. | HK | HB | ET | Imp. rev. | T-Bend-Test | Pencil Hardness | CT | GG 20° | GG 60° |
|---|---|---|---|---|---|---|---|---|---|
| 1.5/300 | 185 | 125 | >10 | >82 | 0 | 2 H | 0 | 88 | 67 |
| 7/200 | 179 | 125 | >10 | >82 | 0-1 | 2 H | 0 | 87 | 69 |
| 10/200 | 182 | 125 | >10 | >82 | 0 | 2 H | 0 | 89 | 70 |
| 20/180 | 180 | 125 | >10 | >82 | 0 | 2 H | 0 | 86 | 68 |
| 30/170 | 178 | 125 | >10 | >82 | 0-1 | 2 H | 0 | 87 | 67 |

The film thickness of the enamel films amounted to 25 to 30 μm.
The storage stability of the enamel solutions according to the invention was given after 9-months storage both at room temperature and at +5° C.

EXAMPLE 2

Production, application and hardening of the enamel occurred according to C 1.

Formulation:
40.72% by wt polyester solution according to B 2.
21.78% by wt solution of cross-linking agent according to A 2b
7.0% by wt solution mixture according to varnish solution used
29.4% by wt white pigment (TiO₂)
1.0% by wt defoaming agent (Byk-spezial)
0.1% by wt leveling agent (silicone oil OL)

EXAMPLE 3

Production, application and hardening of the enamel occurred according to C 1.
Formulation:
40.89% by wt polyester solution according to B2
21.61% by wt solution of cross-linking agent according to A 1b
7.0% by wt solution mixture according to varnish solution used
29.4% by wt white pigment (TiO₂)
1.0% by wt defoaming agent (Byk-spezial)
0.1% by wt leveling agent (silicone oil OL)

| Hardening Conditions Time/Temp. min./°C. | HK | HB | ET | Imp. rev. | T-Bend-Test | Pencil Hardness | CT | GG 20° | GG 60° |
|---|---|---|---|---|---|---|---|---|---|
| 1.5/300 | 184 | 125 | >10 | >82 | 0 | 2 H | 0 | 88 | 70 |
| 7/200 | 187 | 125 | >10 | >82 | 0-1 | 2 H | 0 | 90 | 72 |
| 10/200 | 187 | 125 | >10 | >82 | 0 | 2 H | 0 | 89 | 71 |
| 20/180 | 183 | 111 | >10 | >82 | 0 | 2 H | 0 | 86 | 68 |
| 30/170 | 184 | 111 | >10 | >82 | 0 | 2 H | 0 | 87 | 69 |

The film thickness of the enamel films amounted to 25 to 30 μm.

EXAMPLE 4

Production, application and hardening of the enamel occurred according to C 1.
Formulation:
41.45% by wt polyester solution according to B 3
21.05% by wt solution of cross-linking agent according to A 2b
7.0% by wt solution mixture according to varnish solution used
29.4% by wt white pigment (TiO₂)
1.0% by wt defoaming agent (Byk-spezial)
0.1% by wt leveling agent (silicone oil OL)

| Hardening Conditions Time/Temp. min./°C. | HK | HB | ET | Imp. rev. | T-Bend-Test | Pencil Hardness | CT | GG 20° | GG 60° |
|---|---|---|---|---|---|---|---|---|---|
| 1.5/300 | 188 | 125 | >10 | >82 | 0 | 2 H | 0 | 89 | 68 |
| 7/200 | 187 | 125 | >10 | >82 | 0 | 2 H | 0 | 87 | 68 |
| 10/200 | 189 | 125 | >10 | >82 | 0 | 2H-3H | 0 | 89 | 71 |
| 20/180 | 184 | 125 | >10 | >82 | 0 | 2 H | 0 | 90 | 70 |
| 30/170 | 185 | 111 | >10 | >82 | 0-1 | 2 H | 0 | 88 | 67 |

The film thickness of the enamel films amounted to 25 to 30 μm.

| Hardening Conditions Time/Temp. min./°C. | HK | HB | ET | Imp. rev. | T-Bend-Test | Pencil Hardness | CT | GG 20° | GG 60° |
|---|---|---|---|---|---|---|---|---|---|
| 1.5/300 | 190 | 125 | >10 | >82 | 0 | 2 H | 0 | 92 | 73 |
| 7/200 | 187 | 125 | >10 | >82 | 0–1 | 2 H | 0 | 89 | 69 |
| 10/200 | 192 | 125 | >10 | >82 | 0 | 2H–3H | 0 | 91 | 71 |
| 20/180 | 190 | 125 | >10 | >82 | 0 | 2 H | 0 | 90 | 70 |
| 30/170 | 188 | 125 | >10 | >82 | 0–1 | 2 H | 0 | 90 | 70 |

The film thickness of the enamel films amounted to 25 to 30 μm.

EXAMPLE 5

Production, application and hardening of the enamel occurred according to C 1.
Formulation:
41.45% by wt polyester solution according to B 1
21.05% by wt solution of cross-linking agent according to A 2b
7.0% by wt solution mixture according to varnish solution used
29.4% by wt white pigment (TiO$_2$)
1.0% by wt defoaming agent (Byk-spezial)
0.1% by wt leveling agent (silicone oil OL)

| Hardening Conditions Time/Temp. min./°C. | HK | HB | ET | Imp. rev. | T-Bend-Test | Pencil Hardness | CT | GG 20° | GG 60° |
|---|---|---|---|---|---|---|---|---|---|
| 1.5/300 | 172 | 111 | >10 | >82 | 0 | H–2 H | 0 | 86 | 68 |
| 7/200 | 170 | 111 | >10 | >82 | 0–1 | H–2 H | 0 | 88 | 67 |
| 10/200 | 175 | 125 | >10 | >82 | 0 | 2 H | 0 | 95 | 64 |
| 20/180 | 176 | 111 | >10 | >82 | 0 | 2 H | 0 | 87 | 68 |
| 30/170 | 172 | 111 | >10 | >82 | 0–1 | H–2 H | 0 | 82 | 65 |

The film thickness of the enamel films amounted to 25 to 30 μm.

EXAMPLE 6

Production, application and hardening of the enamel occurred according to C 1.
Formulation:
41.61% by wt polyester solution according to B 1
20.89% by wt solution of cross-linking agent according to A 1b
7.0% by wt solution mixture according to varnish solution used
29.4% by wt white pigment (TiO$_2$)
1.0% by wt defoaming agent (Byk-spezial)
0.1% by wt leveling agent (silicone oil OL)

| Hardening Conditions Time/Temp. min./°C. | HK | HB | ET | Imp. rev. | T-Bend-Test | Pencil Hardness | CT | GG 20° | GG 60° |
|---|---|---|---|---|---|---|---|---|---|
| 1.5/300 | 173 | 111 | >10 | >82 | 0 | H–2 H | 0 | 87 | 71 |
| 7/200 | 172 | 111 | >10 | >82 | 0–1 | H–2 H | 0 | 83 | 68 |
| 10/200 | 174 | 111 | >10 | >82 | 0 | 2H | 0 | 86 | 70 |
| 20/180 | 170 | 125 | >10 | >82 | 0–1 | H–2 H | 0 | 85 | 73 |
| 30/170 | 174 | 111 | >10 | >82 | 0 | 2H | 0 | 82 | 67 |

The film thickness of the enamel films amounted to 25 to 30 μm.

EXAMPLE 7

Production, application and hardening of the enamel occurred according to C 1.
Formulation:
43.58% by wt polyester solution according to B 2
18.92% by solution of cross-linking agent according to A 3b
7.0% by wt solution mixture according to varnish solution used
29.4% by wt white pigment (TiO$_2$)
1.0% by wt defoaming agent (Byk-spezial)
0.1% by wt leveling agent (silicone oil OL)

| Hardening Conditions Time/Temp. min./°C. | HK | HB | ET | Imp. rev. | T-Bend-Test | Pencil Hardness | CT | GG 20° | GG 60° |
|---|---|---|---|---|---|---|---|---|---|
| 1.5/300 | 170 | 111 | >10 | >82 | 0–1 | H–2H | 0 | 86 | 67 |
| 7/200 | 167 | 111 | >10 | >82 | 0 | H | 0 | 84 | 65 |
| 10/200 | 171 | 125 | >10 | >82 | 0–1 | H–2H | 0 | 87 | 68 |
| 20/180 | 168 | 111 | >10 | >82 | 0 | H | 0 | 83 | 66 |
| 30/170 | 165 | 111 | >10 | >82 | 0–1 | H | 0 | 84 | 64 |

The film thickness of the enamel films amounted to 25 to 30 μm.

EXAMPLE 8

Production, application and hardening of the enamel occurred according to C 1.

Formulation:
42.93% by wt polyester solution according to B 4
19.57% by wt solution of cross-linking agent according to A 3b
7.0% by wt solution mixture according to varnish solution used
29.4% by wt white pigment (TiO$_2$)
1.0% by wt defoaming agnet (Byk-spezial)
0.1% by wt leveling agent (silicone oil OL)

| Hardening Conditions Time/Temp. min./°C. | HK | HB | ET | Imp. rev. | T-Bend-Test | Pencil Hardness | CT | GG 20° | GG 60° |
|---|---|---|---|---|---|---|---|---|---|
| 1.5/300 | 180 | 125 | >10 | >82 | 0 | 2H | 0 | 88 | 69 |
| 7/200 | 178 | 111 | >10 | >82 | 0-1 | 2H | 0 | 91 | 71 |
| 10/200 | 181 | 125 | >10 | >82 | 0 | 2H | 0 | 87 | 68 |
| 20/180 | 179 | 111 | >10 | >82 | 0 | 2H | 0 | 89 | 68 |
| 30/170 | 177 | 111 | >10 | >82 | 0-1 | H-2H | 0 | 86 | 67 |

The film thickness of the enamel films amounted to 25 to 30 μm.

EXAMPLE 9

Production, application and hardening of the enamel occurred according to C 1.

Formulation:
44.54% by wt polyester solution according to B 4
17.96% by wt solution of cross-linking agent according to A 4b
7.0% by wt solution mixture according to varnish solution used
29.4% by wt white pigment (TiO$_2$)
1.0% by wt defoaming agent (Byk-spezial)
0.1% by wt leveling agent (silicone oil OL)

| Hardening Conditions Time/Temp. min./°C. | HK | HB | ET | Imp. rev. | T-Bend-Test | Pencil Hardness | CT | GG 20° | GG 60° |
|---|---|---|---|---|---|---|---|---|---|
| 1.5/300 | 175 | 111 | >10 | >82 | 0 | H-2H | 0 | 85 | 67 |
| 7/200 | 173 | 111 | >10 | >82 | 0-1 | H-2H | 0 | 87 | 69 |
| 10/200 | 176 | 111 | >10 | >82 | 0 | H-2H | 0 | 84 | 65 |
| 20/180 | 172 | 111 | >10 | >82 | 0 | H-2H | 0 | 86 | 66 |
| 30/170 | 170 | 111 | >10 | >82 | 0-1 | H-2H | 0 | 83 | 64 |

The film thickness of the enamel films amounted to 25 to 30 μm.

EXAMPLE 10

Production, application and hardening of the enamel occurred according to C 1.

Formulation:
41.54% by wt polyester solution according to B 2
20.96% by wt solution of cross-linking agent according to A 2c
7.0% by wt solution mixture according to varnish solution used
29.4% by wt white pigment (TiO$_2$)
1.0% by wt defoaming agent (Byk-spezial)
0.1% by wt leveling agent (silicone oil OL)

| Hardening Conditions Time/Temp. min./°C. | HK | HB | ET | Imp. rev. | T-Bend-Test | Pencil Hardness | CT | GG 20° | GG 60° |
|---|---|---|---|---|---|---|---|---|---|
| 7/200 | 180 | 125 | >10 | >82 | 0-1 | H-2H | 0 | 85 | 67 |
| 10/180 | 178 | 125 | >10 | >82 | 0 | H-2H | 0 | 88 | 67 |
| 14/170 | 176 | 111 | >10 | >82 | 0-1 | H | 0 | 86 | 64 |
| 18/160 | 177 | 111 | >10 | >82 | 0-1 | H | 0 | 84 | 65 |
| 23/150 | 175 | 111 | >10 | >82 | 1 | H | 0 | 82 | 66 |

The film thickness of the enamel films amounted to 25 to 30 μm.

EXAMPLE 11

Production, application and hardening of the enamel occurred according to C 1.

Formulation:
42.23% by wt polyester solution according to B 2
20.27% by wt solution of cross-linking agent according to A 2d
7.0% by wt solution mixture according to varnish solution used
29.4% by wt white pigment (TiO$_2$)
1.0% by wt defoaming agent (Byk-spezial)
0.1% by wt leveling agent (silicone oil OL)

| Hardening Conditions Time/Temp. min./°C. | HK | HB | ET | Imp. rev. | T-Bend-Test | Pencil Hardness | CT | GG 20° | GG 60° |
|---|---|---|---|---|---|---|---|---|---|
| 7/200 | 178 | 111 | >10 | >82 | 0 | H-2H | 0 | 85 | 66 |

-continued

| Hardening Conditions Time/Temp. min./°C. | HK | HB | ET | Imp. rev. | T-Bend-Test | Pencil Hardness | CT | GG 20° | GG 60° |
|---|---|---|---|---|---|---|---|---|---|
| 10/180 | 180 | 125 | >10 | >82 | 0–1 | 2H | 0 | 83 | 64 |
| 14/170 | 176 | 111 | >10 | >82 | 0 | H–2H | 0 | 84 | 65 |
| 18/160 | 174 | 111 | >10 | >82 | 0 | H | 0 | 81 | 62 |
| 23/150 | 175 | 111 | >10 | >82 | 0–1 | H–2H | 0 | 86 | 64 |

The film thickness of the enamel films amounted to 25 to 30 μm.

EXAMPLE 12

Production, application and hardening of the enamel occurred according to C 1.
Formulation:
42.23% by wt polyester solution according to B 2
20.17% by wt solution of cross-linking agent according to A 1d
7.0% by wt solution mixture according to varnish solution used
29.4% by wt white pigment (TiO₂)
1.0% by wt defoaming agent (Byk-spezial)
0.1% by wt leveling agent (silicone oil OL)

| Hardening Conditions Time/Temp. min./°C. | HK | HB | ET | Imp. rev. | T-Bend-Test | Pencil Hardness | CT | GG 20° | GG 60° |
|---|---|---|---|---|---|---|---|---|---|
| 7/200 | 177 | 111 | >10 | >82 | 0 | H | 0 | 84 | 63 |
| 10/180 | 176 | 111 | >10 | >82 | 0–1 | H–2H | 0 | 88 | 67 |
| 14/170 | 178 | 125 | >10 | >82 | 0 | H–2H | 0 | 85 | 66 |
| 18/160 | 175 | 111 | >10 | >82 | 0–1 | H | 0 | 86 | 64 |
| 23/150 | 173 | 111 | >10 | >82 | 0–1 | H | 0 | 87 | 67 |

The film thickness of the enamel films amounted to 25 to 30 μm.

EXAMPLE 13

Production, application and hardening of the enamel occurred according to C 1.
Formulation:
42.93% by wt polyester solution according to B 3
19.57% by wt solution of cross-linking agent according to A 2d
7.0% by wt solution mixture according to varnish solution used
29.4% by wt white pigment (TiO₂)
1.0% by wt defoaming agent (Byk-spezial)
0.1% by wt leveling agent (silicone oil OL)

O.Z. 3900

| Hardening Conditions Time min./Temp. °C. | HK | HB | ET | Imp. rev. | T-Bend-Test | Pencil Hardness | CT | GG 20° | GG 60° |
|---|---|---|---|---|---|---|---|---|---|
| 7/200 | 180 | 125 | >10 | >82 | 0–1 | 2H | 0 | 85 | 68 |
| 10/180 | 182 | 125 | >10 | >82 | 0 | 2H | 0 | 87 | 69 |
| 14/170 | 178 | 125 | >10 | >82 | 0 | H–2H | 0 | 86 | 67 |
| 18/160 | 177 | 111 | >10 | >82 | 0 | H–2H | 0 | 84 | 64 |
| 23/150 | 175 | 111 | >10 | >82 | 0–1 | H–2H | 0 | 83 | 65 |

The film thickness of the enamel films amounted to 25 to 30 μm.

EXAMPLE 14

Production, application and hardening of the enamel occurred according to C 1.
Formulation:
42.93% by wt polyester solution according to B 1
19.57% by wt solution of cross-linking agent according to A 2d
7.0% by wt solution mixture according to varnish solution used
29.4% by wt white pigment (TiO₂)
1.0% by wt defoaming agent (Byk-spezial)
0.1% by wt leveling agent (silicone oil OL)

O.Z. 3900

| Hardening Conditions Time min./Temp. °C. | HK | HB | ET | Imp. rev. | T-Bend-Test | Pencil Hardness | CT | GG 20° | GG 60° |
|---|---|---|---|---|---|---|---|---|---|
| 7/200 | 170 | 111 | >10 | >82 | 0 | H–2H | 0 | 88 | 71 |
| 10/180 | 169 | 111 | >10 | >82 | 0–1 | H–2H | 0 | 84 | 67 |
| 14/170 | 172 | 111 | >10 | >82 | 0 | H–2H | 0 | 86 | 68 |
| 18/160 | 168 | 111 | >10 | >82 | 0–1 | H | 0 | 87 | 68 |
| 23/150 | 167 | 111 | >10 | >82 | 0 | H | 0 | 85 | 67 |

The film thickness of the enamel films amounted to 25 to 30 μm.

EXAMPLE 15

Production, application and hardening of the enamel occurred according to C 1.

Formulation:
43.03% by wt polyester solution according to B 1
19.47% by wt solution of cross-linking agent according to A 1d
7.0% by wt solution mixture according to varnish solution used
29.4% by wt white pigment (TiO$_2$)
1.0% by wt defoaming agent (Byk-spezial)
0.1% by wt leveling agent (silicone oil OL)

O.Z. 3900

| Hardening Conditions Time min./Temp. °C. | Mechanical Characteristics |   |   |   |   |   |   |   |   |
|---|---|---|---|---|---|---|---|---|---|
|  | HK | HB | ET | Imp. rev. | T-Bend-Test | Pencil Hardness | CT | GG 20°⊀ | GG 60°⊀ |
| 7/200 | 168 | 111 | >10 | >82 | 0 | H | 0 | 84 | 66 |
| 10/180 | 170 | 111 | >10 | >82 | 0 | H-2H | 0 | 82 | 62 |
| 14/170 | 167 | 111 | >10 | >82 | 0 | H | 0 | 86 | 67 |
| 18/160 | 165 | 111 | >10 | >82 | 0 | H | 0 | 85 | 64 |
| 23/150 | 166 | 111 | >10 | >82 | 0 | H | 0 | 83 | 62 |

The film thickness of the enamel films amounted to 25 to 30 μm.

EXAMPLE 16

Production, application and hardening of the enamel occurred according to C 1.

Formulation:
44.76% by wt polyester solution according to B 4
17.74% by wt solution of cross-linking agent according to A 3d
7.0% by wt solution mixture according to varnish solution used
29.4% by wt white pigment (TiO$_2$)
1.0% by wt defoaming agent (Byk-spezial)
0.1% by wt leveling agent (silicone oil OL)

O.Z. 3900

| Hardening Conditions Time min./Temp. °C. | Mechanical Characteristics |   |   |   |   |   |   |   |   |
|---|---|---|---|---|---|---|---|---|---|
|  | HK | HB | ET | Imp. rev. | T-Bend-Test | Pencil Hardness | CT | GG 20°⊀ | GG 60°⊀ |
| 7/200 | 168 | 111 | >10 | >82 | 0 | H | 0 | 84 | 67 |
| 10/180 | 171 | 125 | >10 | >82 | 0-1 | H-2H | 0 | 86 | 68 |
| 14/170 | 169 | 111 | >10 | >82 | 0 | H-2H | 0 | 85 | 66 |
| 18/160 | 168 | 111 | >10 | >82 | 0-1 | H-2H | 0 | 87 | 67 |
| 23/150 | 165 | 111 | >10 | >82 | 0-1 | H | 0 | 84 | 65 |

The film thickness of the enamel films amounted to 25 to 30 μm.

EXAMPLE 17

Production, application and hardening of the enamel occurred according to C 1.

Formulation:
45.37% by wt polyester solution according to B 3
17.13% by wt solution of cross-linking agent according to A 3d
7.0% by wt solution mixture according to varnish solution used
29.4% by wt white pigment (TiO$_2$)
1.0% by wt defoaming agent (Byk-spezial)
0.1% by wt leveling agent (silicone oil OL)

O.Z. 3900

| Hardening Conditions Time min./Temp. °C. | Mechanical Characteristics |   |   |   |   |   |   |   |   |
|---|---|---|---|---|---|---|---|---|---|
|  | HK | HB | ET | Imp. rev. | T-Bend-Test | Pencil Hardness | CT | GG 20°⊀ | GG 60°⊀ |
| 7/200 | 171 | 125 | >10 | >82 | 0 | 2H | 0 | 88 | 70 |
| 10/180 | 169 | 111 | >10 | >82 | 0-1 | H-2H | 0 | 85 | 68 |
| 14/170 | 171 | 125 | >10 | >82 | 0-1 | H-2H | 0 | 86 | 67 |
| 18/160 | 167 | 111 | >10 | >82 | 0 | H-2H | 0 | 84 | 66 |
| 23/150 | 168 | 111 | >10 | >82 | 0-1 | H | 0 | 87 | 68 |

The film thickness of the enamel films amounted to 25 to 30 μm.

EXAMPLE 18

Production, application and hardening of the enamel occurred according to C 1.

Formulation:
46.49% by wt polyester solution according to B 4
16.01% by wt solution of cross-linking agent according to A 4d
7.0% by wt solution mixture according to varnish solution used
29.4% by wt white pigment (TiO$_2$)
1.0% by wt defoaming agent (Byk-spezial)
0.1% by wt leveling agent (silicone oil OL)

| Hardening Conditions Time min./ Temp. °C. | HK | HB | ET | Imp. rev. | T-Bend-Test | Pencil Hardness | CT | GG 20° | GG 60° |
|---|---|---|---|---|---|---|---|---|---|
| 7/200 | 162 | 100 | >10 | >82 | 0 | H | 0 | 86 | 69 |
| 10/180 | 160 | 100 | >10 | >82 | 0 | H | 0 | 87 | 69 |
| 14/170 | 163 | 111 | >10 | >82 | 0 | H | 0 | 83 | 64 |
| 18/160 | 159 | 100 | >10 | >82 | 0 | H | 0 | 84 | 65 |
| 23/150 | 160 | 100 | >10 | >82 | 0 | H | 0 | 81 | 62 |

The film thickness of the enamel films amounted to 25 to 30 μm.

EXAMPLE 19

Production, application and hardening of the enamel occurred according to C 1.
Formulation:
38.07% by wt polyester solution according to B 2
24.43% by wt solution of cross-linking agent according to A 5a
7.0% by wt solution mixture according to varnish solution used
29.4% by wt white pigment (TiO$_2$)
1.0% by wt defoaming agent (Byk-spezial)
0.1% by wt leveling agent (silicone oil OL)

| Hardening Conditions Time min./ Temp. °C. | HK | HB | ET | Imp. rev. | T-Bend-Test | Pencil Hardness | CT | GG 20° | GG 60° |
|---|---|---|---|---|---|---|---|---|---|
| 1.5/300 | 185 | 125 | >10 | >82 | 1 | 2H | 0 | 87 | 70 |
| 7/200 | 183 | 125 | >10 | >82 | 1-2 | 2H | 0 | 89 | 71 |
| 10/200 | 186 | 125 | >10 | >82 | — | 2H | 0 | 90 | 74 |
| 20/180 | 182 | 125 | >10 | >82 | 1 | 2H | 0 | 88 | 69 |
| 30/170 | 180 | 125 | >10 | >82 | 1-2 | 2H | 0 | 86 | 70 |

The film thickness of the enamel films amounted to 25 to 30 μm.

EXAMPLE 20

Production, application and hardening of the enamel occurred according to C 1.
Formulation:
39.28% by wt polyester solution according to B 2
23.22% by wt solution of cross-linking agent according to A 5b
7.0% by wt solution mixture according to varnish solution used
29.4% by wt white pigment (TiO$_2$)
1.0% by wt defoaming agent (Byk-spezial)
0.1% by wt leveling agent (silicone oil OL)

| Hardening Conditions Time min./ Temp. °C. | HK | HB | ET | Imp. rev. | T-Bend-Test | Pencil Hardness | CT | GG 20° | GG 60° |
|---|---|---|---|---|---|---|---|---|---|
| 1.5/300 | 184 | 125 | >10 | >82 | 1-2 | 2H | 0 | 87 | 70 |
| 7/200 | 189 | 125 | >10 | >82 | 1 | 2H—3H | 0 | 89 | 72 |
| 10/200 | 187 | 125 | >10 | >82 | 1-2 | 2H | 0 | 86 | 69 |
| 20/180 | 186 | 125 | >10 | >82 | 1-2 | 2H | 0 | 88 | 70 |
| 30/170 | 189 | 125 | >10 | >82 | 1-2 | 2H | 0 | 85 | 68 |

The film thickness of the enamel films amounted to 25 to 30 μm.

EXAMPLE 21

Production, application and hardening of the enamel occurred according to C 1.
Formulation:
40.03% by wt polyester solution according to B 1
16.97% by wt solution of cross-linking agent according to A 5b
7.0% by wt solution mixture according to varnish solution used
29.4% by wt white pigment (TiO$_2$)
1.0% by wt defoaming agent (Byk-spezial)
0.1% by wt leveling agent (silicone oil OL)

| Hardening Conditions Time min./ Temp. °C. | HK | HB | ET | Imp. rev. | T-Bend-Test | Pencil Hardness | CT | GG 20° | GG 60° |
|---|---|---|---|---|---|---|---|---|---|
| 1.5/300 | 172 | 125 | >10 | >82 | 1 | 2H | 0 | 87 | 70 |
| 7/200 | 169 | 111 | >10 | >82 | 1 | 2H | 0 | 86 | 72 |
| 10/200 | 173 | 125 | >10 | >82 | 0-1 | 2H | 0 | 90 | 73 |
| 20/180 | 170 | 111 | >10 | >82 | 0-1 | 2H | 0 | 88 | 69 |

-continued

| Hardening Conditions Time min./ Temp. °C. | HK | HB | ET | Imp. rev. | T-Bend-Test | Pencil Hardness | CT | O.Z. 3900 GG 20° | GG 60° |
|---|---|---|---|---|---|---|---|---|---|
| 30/170 | 168 | 111 | >10 | >82 | 1 | H–2H | 0 | 84 | 67 |

The film thickness of the enamel films amounted to 25 to 30 μm.

EXAMPLE 22

Production, application and hardening of the enamel occurred according to C 1.
Formulation:

42.19% by wt polyester solution according to B 4
20.31% by wt solution of cross-linking agent according to A 6b
7.0% by wt solution mixture according to varnish solution used
29.4% by wt white pigment (TiO$_2$)
1.0% by wt defoaming agent (Byk-spezial)
0.1% by wt leveling agent (silicone oil OL)

| Hardening Conditions Time min./ Temp. °C. | HK | HB | ET | Imp. rev. | T-Bend-Test | Pencil Hardness | CT | O.Z. 3900 GG 20° | GG 60° |
|---|---|---|---|---|---|---|---|---|---|
| 1.5/300 | 169 | 111 | >10 | >82 | 0–1 | H–2H | 0 | 88 | 68 |
| 7/200 | 165 | 111 | >10 | >82 | 0–1 | H–2H | 0 | 85 | 69 |
| 10/200 | 168 | 111 | >10 | >82 | 0–1 | 2H | 0 | 88 | 67 |
| 20/180 | 164 | 100 | >10 | >82 | 0–1 | H–2H | 0 | 86 | 64 |
| 30/170 | 164 | 100 | >10 | >82 | 1 | H–2H | 0 | 87 | 68 |

The film thickness of the enamel films amounted to 25 to 30 μm.

EXAMPLE 23

Production, application and hardening of the enamel occurred according to C 1.
Formulation:
43.91% by wt polyester solution according to B 4
18.59% by wt solution of cross-linking agent according to A 7b
7.0% by wt solution mixture according to varnish solution used
29.4% by wt white pigment (TiO$_2$)
1.0% by wt defoaming agent (Byk-spezial)
0.1% by wt leveling agent (silicone oil OL)

| Hardening Conditions Time min./ Temp. °C. | HK | HB | ET | Imp. rev. | T-Bend-Test | Pencil Hardness | CT | O.Z. 3900 GG 20° | GG 60° |
|---|---|---|---|---|---|---|---|---|---|
| 1.5/300 | 161 | 100 | >10 | >82 | 0 | H | 0 | 84 | 68 |
| 7/200 | 160 | 100 | >10 | >82 | 0 | H | 0 | 88 | 72 |
| 10/200 | 162 | 100 | >10 | >82 | 0 | H | 0 | 86 | 70 |
| 20/180 | 158 | 100 | >10 | >82 | 0 | H | 0 | 87 | 69 |
| 30/170 | 159 | 100 | >10 | >82 | 0–1 | H | 0 | 88 | 69 |

The film thickness of the enamel films amounted to 25 to 30 μm.

EXAMPLE 24

Production, application and hardening of the enamel occurred according to C 1.
Formulation:
43.92% by wt polyester solution according to B 4
18.58% by wt solution of cross-linking agent according to A 6d
7.0% by wt solution mixture according to varnish solution used
29.4% by wt white pigment (TiO$_2$)
1.0% by wt defoaming agent (Byk-spezial)
0.1% by wt leveling agent (silicone oil OL)

| Hardening Conditions Time min./ Temp. °C. | HK | HB | ET | Imp. rev. | T-Bend-Test | Pencil Hardness | CT | O.Z. 3900 GG 20° | GG 60° |
|---|---|---|---|---|---|---|---|---|---|
| 7/200 | 167 | 111 | >10 | >82 | 0–1 | H | 0 | 89 | 69 |
| 10/180 | 165 | 100 | >10 | >82 | 0 | H | 0 | 91 | 72 |
| 14/170 | 166 | 111 | >10 | >82 | 0–1 | H–2H | 0 | 88 | 71 |
| 18/160 | 162 | 100 | >10 | >82 | 0–1 | H | 0 | 90 | 69 |
| 23/150 | 161 | 100 | >10 | >82 | 0–1 | H | 0 | 90 | 70 |

The film thickness of the enamel films amounted to 25 to 30 μm.

EXAMPLE 25

Production, application and hardening of the enamel occurred according to C 1.

Formulation:
45.86% by wt polyester solution according to B 4
16.64% by wt solution of cross-linking agent according to A 7d
7.0% by wt solution mixture according to varnish solution used
29.4% by wt white pigment (TiO₂)
1.0% by wt defoaming agent (Byk-spezial)
0.1% by wt leveling agent (silicone oil OL)

O.Z. 3900

| Hardening Conditions Time min./ Temp. °C. | HK | HB | ET | Imp. rev. | T-Bend-Test | Pencil Hardness | CT | GG 20° | GG 60° |
|---|---|---|---|---|---|---|---|---|---|
| 7/200 | 162 | 100 | >10 | >82 | 0 | H | 0 | 86 | 70 |
| 10/180 | 159 | 100 | >10 | >82 | 0 | H | 0 | 87 | 69 |
| 14/170 | 161 | 100 | >10 | >82 | 0-1 | H | 0 | 84 | 68 |
| 18/160 | 158 | 100 | >10 | >82 | 0 | H | 0 | 88 | 70 |
| 23/150 | 158 | 100 | >10 | >82 | 0-1 | H | 0 | 95 | 67 |

The film thickness of the enamel films amounted to 25 to 30 μm.

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. One-component baking enamels comprising polyesters, which contain hydroxyl groups, and a polyisocyanate component, wherein the polyisocyanate component is a totally or partially blocked adduct or adducts of a mixture of 2-methyl-1,5-diisocyanatopentane (I) and 2-ethyl-1,4-diisocyanatobutane (II) according to the formulas (I) and (II):

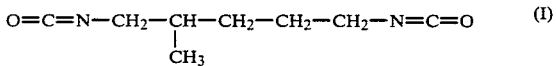

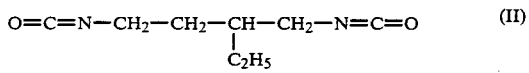

wherein said mixture of diisocyanates comprises about 88 to 99% by weight of totally or partially blocked 2-methyl-1,5-diisocyanatopentane and about 12 to 1% by weight of totally or partially 2-ethyl-1,4-diisocyanatobutane.

2. The one-component baking enamels of claim 1, which further comprises adduct-free 2-methyl-1,5-diisocyanatopentane, 2-ethyl-1,5-diisocyanatobutane or a mixture thereof.

3. The one-component baking enamels of claim 1, wherein said adduct or adducts is 2-methyl-1,5-diisocyanotopentane or a mixture of 2-methyl-1,5-diisocyanatopentane and 2-ethyl-1,5-diisocyanatopentane or trimerized 2-methyl-1,5-diisocyanatopentane or a trimerized mixture of 2-methyl-1,5-diisocyanatopentane and 2-ethyl-1,5-diisocyanatobutane, each compound or mixture having an average NCO content of about 10 to 40% by weight.

4. The one-component baking enamels of claim 3, wherein the average NCO content of said adduct or adducts is reduced to less than or equal to 8% by weight by a blocking agent.

5. The one-component baking enamels of claim 1, wherein said adduct or adducts is the reaction product of diols or polyols or a mixture thereof with 2-methyl-1,5-diisocyanatopentane or a mixture of 2-methyl-1,5-diisocyanatopentane and 2-ethyl-1,5-diisocyanatobutane.

6. The one-component baking enamels of claim 5, wherein said diols and polyols are selected from the group consisting of ethylene glycol, 1,4-butylene glycol, hexamethylene glycol, neopentyl glycol, hydroxypivalic acid neopentyl glycol ester, 1,4-dihydroxymethylcyclohexane, 2,4,4-(2,2,4)-trimethylhexanediol, diethylene glycol, triethylene glycol, diethanol methylamine, triethanolamine, trimethylolpropane, trimethylolethane and pentaerythritol.

7. The one-component baking enamels of claim 1, wherein said polyesters containing hydroxyl groups comprise cyclic polycarboxylic acids and the esters and anhydrides thereof, diols and polyols.

8. The one-component baking enamels of claim 7, wherein said cyclic polycarboxylic acids and the esters and anhydrides thereof are selected from the group of phthalic acid, isophthalic acid, terephthalic acid and benzenetricarboxylic acids, trimellitic acid anhydride and diethyl terephthalate.

9. The one-component baking enamels of claim 7, wherein said diols are selected from the group of ethylene glycol, 1,2-propylene glycol, 1,2- or 1,3- or 1,4-butylene glycol, 3-methyl-1,5-pentanediol, hexamethylene glycol, cyclohexanediol, 4,4'-dihydroxy-2,2-dicyclohexylpropane, 1,4-dihydroxymethylcyclohexane, diethylene glycol, triethylene glycol, neopentyl glycol, hydroxypivalic acid neopentyl glycol ester and 2,2,4-(2,4,4)-trimethyl-hexanediol.

10. The one-component baking enamels of claim 7, wherein said polyols are selected from the group of glycerin, hexanetriol, pentaerythritol, trimethylolpropane (TMP) and trimethylolethane.

11. The one-component baking enamels of claim 1, which further comprise a solvent having a lower boiling point of about 100° C.

* * * * *